United States Patent Office 3,584,377
Patented June 15, 1971

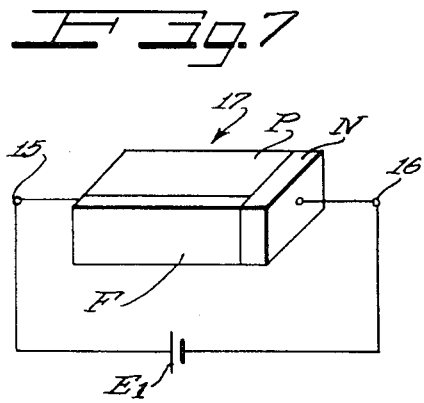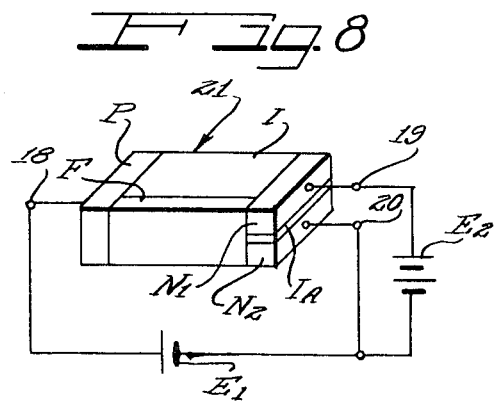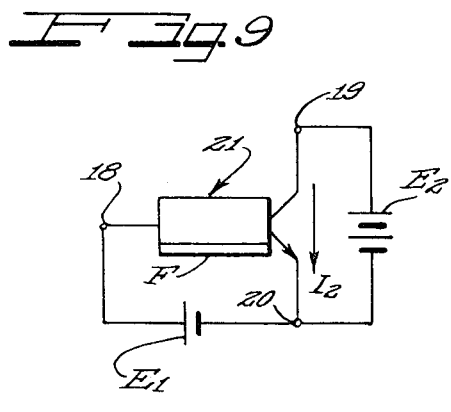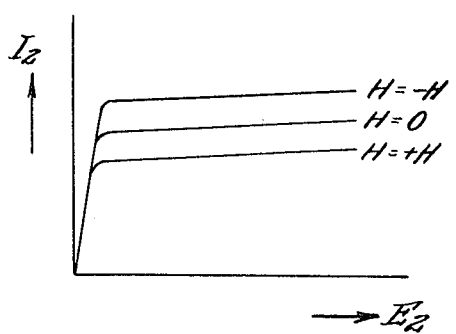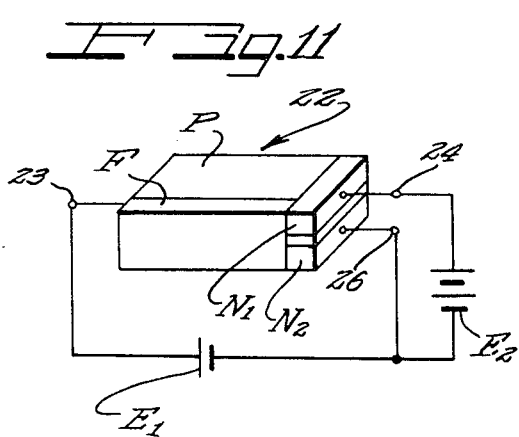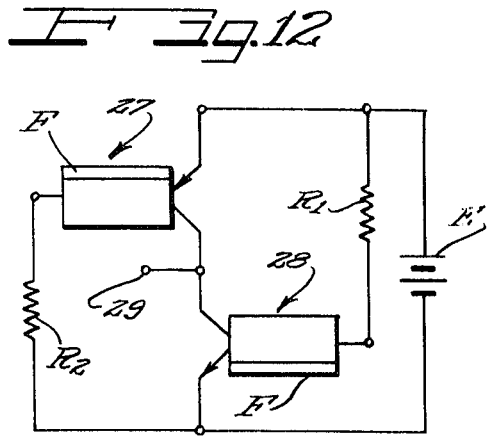

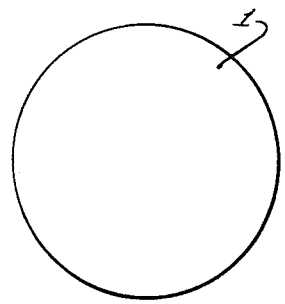
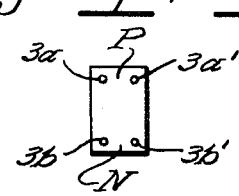
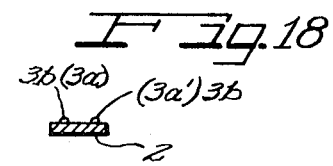
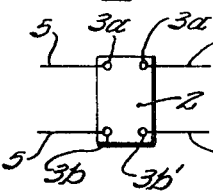
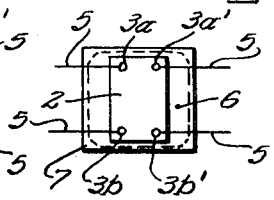
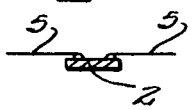
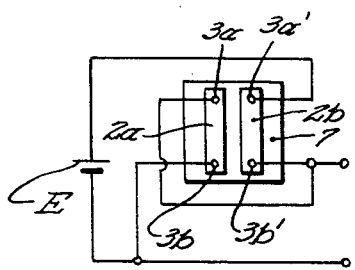
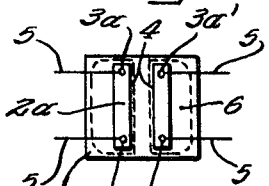
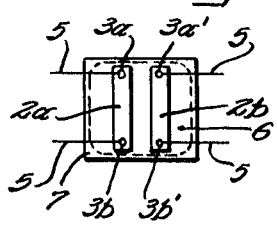
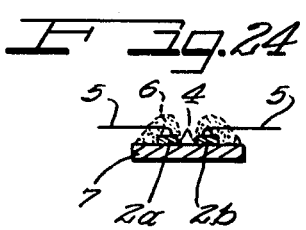
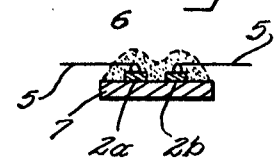

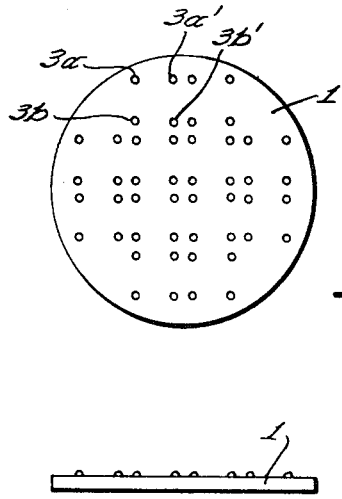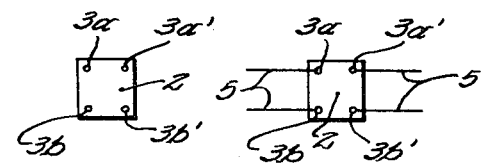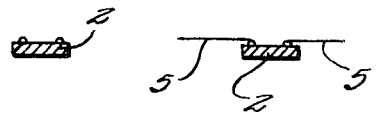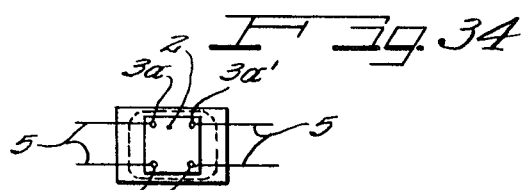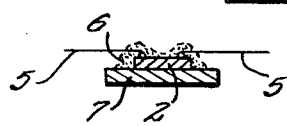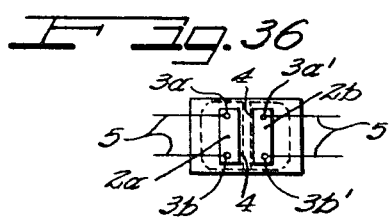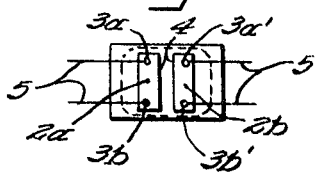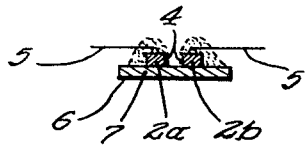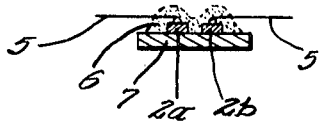

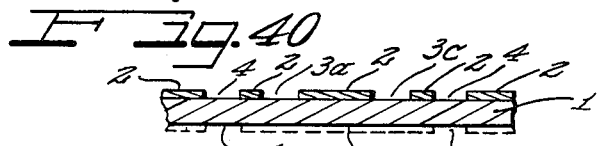
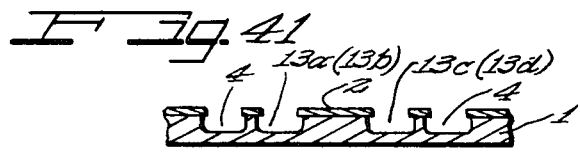
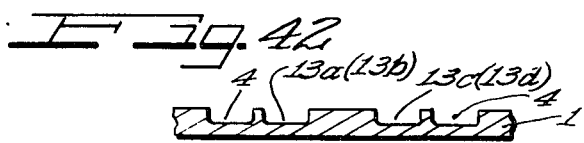
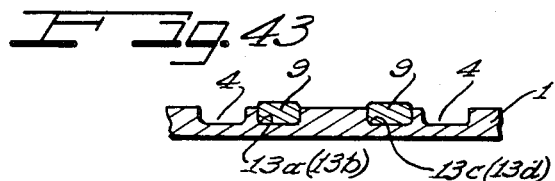
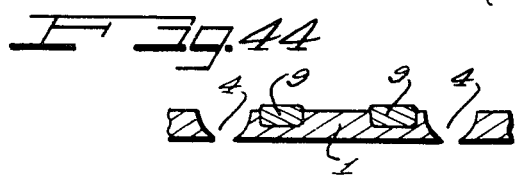
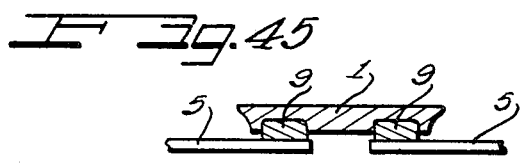
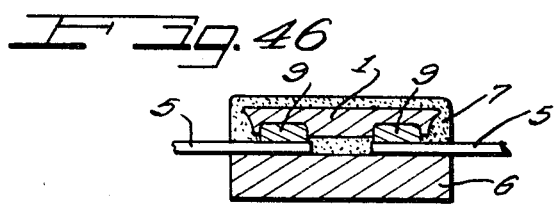
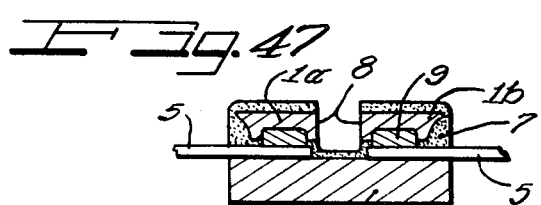
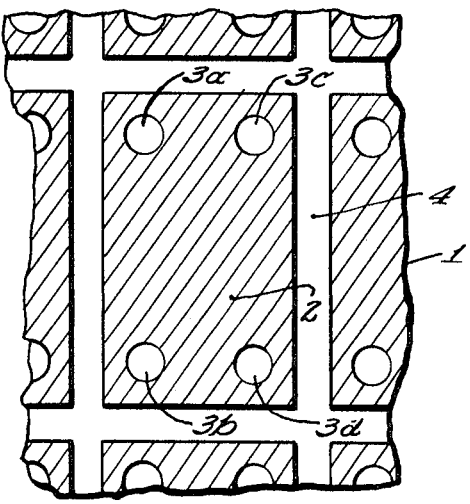
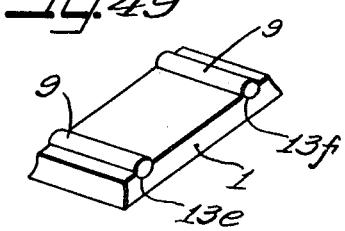
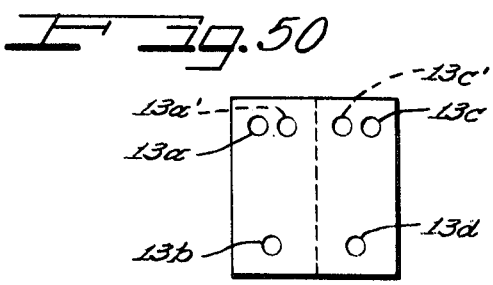
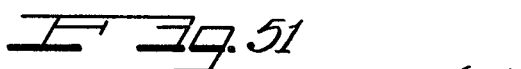
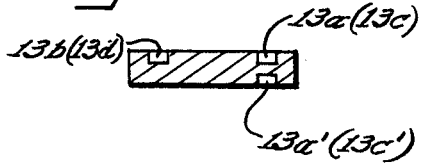

3,584,377
METHOD OF MAKING A MAGNETO-RESISTANCE ELEMENT
Toshiyuki Yamada, Kanagawa-ken, Japan, assignor to Sony Corporation, Tokyo, Japan
Filed July 30, 1968, Ser. No. 748,764
Claims priority, application Japan, Sept. 23, 1967, 42/61,133; Dec. 29, 1967, 43/84,771
Int. Cl. H01j 7/66
U.S. Cl. 29—583
18 Claims

ABSTRACT OF THE DISCLOSURE

Magnetoresistance elements are often used in pairs and it is desirable to have matched elements with similar characteristics for operating in balanced circuits. The present disclosure discloses methods of constructing magnetoresistance elements so that they are matched and have similar characteristics by utilizing thin film techniques that allow elements to be made on the same substrate and heat treated so as to assure uniformity of elements.

CROSS REFERENCES TO RELATED APPLICATIONS

This application relates to apparatus such as disclosed in copending application, Ser. No. 673,658, filed on Oct. 9, 1967 entitled "Magnetoresistance Element," Ser. No. 704,825, filed Feb. 12, 1968 entitled "Magnetoresistance Element" and Ser. No. 693,881, filed Dec. 27, 1967 entitled "Brushless DC Motor" and to methods of constructing magnetoresistance pairs.

BACKGROUND OF THE INVENTION

Field of the invention

This invention relates in general to magnetoresistance elements and in particular to methods and apparatus comprising magnetoresistance elements that are made in pairs so that they are matched and are usable in circuits to obtain balanced results.

Description of the prior art

It is oftentimes desirable to detect magnetic field or to control electronic components in response to variations in magnetic fields. Magnetometers, for example, are required for measuring the earth's magnetic field and must accurately detect the field strength of the earth's magnetic field. Accurate compasses which detect the magnetic field are also important in navigation.

SUMMARY OF THE INVENTION

Methods and apparatus for detecting magnetic fields or for controlling the electrical response by varying a magnetic field is described. Magnetoresistance elements according to this invention are used in circuits in which it is desirable to have matched elements for uniform and balanced response. The present invention discloses methods of constructing matched and balanced elements by forming them simultaneously on a substrate and simultaneously heat-treating them so that uniform results may be obtained. Methods are also disclosed wherein a plurality of pairs of magnetoresistance elements may be constructed and then separated after construction.

The principal object of this invention is to improve the temperature characteristics of a pair of magnetoresistance elements.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 7 is a perspective view of a magnetoresistance element;
FIG. 8 shows a perspective view of a modification of a magnetoresistance element;
FIG. 9 is a connection diagram of the magnetoresistance element shown in FIG. 8;
FIG. 10 is a graph illustrating the voltage and current relationships in the apparatus of FIG. 9;
FIG. 11 illustrates a modification of the magnetoresistance element of this invention;
FIG. 12 illustrates a pair of magnetoresistance elements according to FIG. 9 connected in circuit;
FIG. 13 illustrates a semiconductor wafer in plan view;
FIG. 14 is a sectional view of the wafer of FIG. 13;
FIG. 15 illustrates a wafer pellet cut from the semiconductor wafer of FIG. 13;
FIG. 16 is a sectional view of the pellet of FIG. 15;
FIG. 17 illustrates acceptor and donor impurities alloyed on the substrate of FIG. 15;
FIG. 18 is a sectional view of the pellet of FIG. 17;
FIG. 19 illustrates the pellet of FIG. 17 with leads connected;
FIG. 20 is a sectional view of the pellet of FIG. 19;
FIG. 21 illustrates the pellet of FIG. 19 with a resin coating applied;
FIG. 22 is a sectional view of the pellet of FIG. 21;
FIG. 23 illustrates the pellet which has been cut to isolate the two magnetoresistance elements;
FIG. 24 is a sectional view of the pellet of FIG. 23;
FIG. 25 illustrates the pellet of FIG. 23 coated with a resin;
FIG. 26 illustrates the pellet of FIG. 25 in section;
FIG. 27 is a connection diagram of the component of FIG. 25;
FIG. 28 illustrates a wafer in plan view of a modification of the invention;
FIG. 29 is a side view of the wafer of FIG. 28;
FIG. 30 illustrates an element formed from the wafer illustrated in FIGS. 28 and 29;
FIG. 31 is a sectional view of the element illustrated in FIG. 30;
FIG. 32 illustrates leads connected to the wafer element;
FIG. 33 is a sectional view of the wafer element shown in FIG. 32;
FIG. 34 is a plan view of the wafer element with epoxy applied;
FIG. 35 is a sectional view of the wafer element of FIG. 34;
FIG. 36 is a plan view of the element after cutting into two magnetoresistance elements;
FIG. 37 is a sectional view of the element of FIG. 36;
FIG. 38 is a plan view of the element after applying epoxy to the magnetoresistance element;
FIG. 39 is a sectional view of the element of FIG. 38;
FIG. 40 is a sectional view of a magnetoresistance substrate;

FIG. 41 illustrates the element of FIG. 40 after etching;

FIG. 42 illustrates the magnetoresistance element after the resistive layer has been removed;

FIG. 43 illustrates alloyed portions formed in the substrate;

FIG. 44 is a sectional view of the device shown in FIG. 43;

FIG. 45 illustrates leads attached to the substrate element;

FIG. 46 illustrates the magnetoresistance element after epoxy is applied;

FIG. 47 illustrates the magnetoresistance element after cutting;

FIG. 48 illustrates the substrate in plan view shown in FIG. 40;

FIG. 49 illustrates a modification of the invention;

FIG. 50 illustrates in plan view a modification of the invention; and

FIG. 51 is a modification of the invention.

Other objects, features and advantages of the present invention will be readily apparent from the following detailed description of certain preferred embodiments thereof taken in conjunction with the accompanying drawings.

DESCRIPTION OF THE PREFERRED EMBODIMENTS

Figure 1:
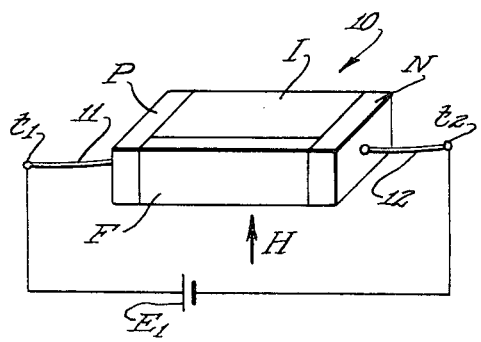
FIG. 1 is a perspective view of a magnetoresistance element according to this invention.

FIG. 1 illustrates a magnetoresistant element 10 which is formed with an intrinsic germanium substrate I into which carriers such as holes and electrons can be sufficiently injected. P and N regions are formed at either end of the intrinsic substrate I and a recombination region F is formed along one side of the intrinsic substrate I between the P and N regions. A battery E1 is connected to terminals $t1$ and $t2$ which are in turn connected to the P and N regions by leads 11 and 12, respectively.

Figure 2:
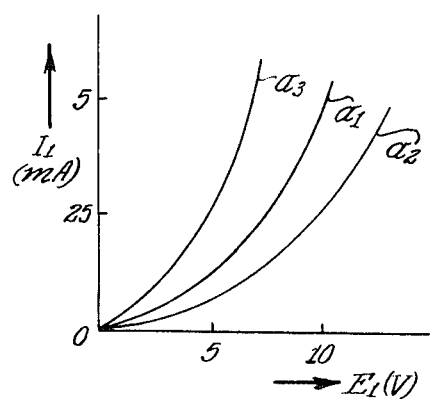
FIG. 2 is a graph showing the current versus voltage characteristics of the magnetoresistance element of FIG. 1.

As shown in FIG. 2, $a1$ shows the characteristic of the magnetoresistive element with no magnetic flux provided. Upon the application of a magnetic field H indicated by the arrow, current between the P and N regions will be directed toward the recombination region F and the current decrease and the resistance increases as shown by curve $a2$ in FIG. 2. When a magnetic field is applied in the reverse direction the current will move away from the recombination region F and will increase and the resistance will decrease as indicated by the curve $a3$ in FIG. 2. The recombination area F may be formed on the intrinsic substrate, for example, by sanding with sandpaper or by sandblasting.

Figure 3:
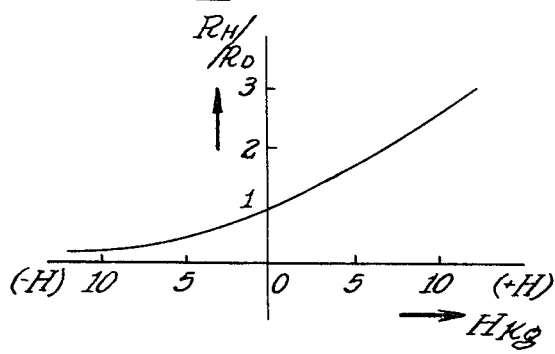
FIG. 3 is a graph showing the magneto field resistance characteristic of a magnetoresistance element.

Thus, the resistance of the magnetoresistant element 10 can be varied by controlling the magnetic field H applied to it. FIG. 3 illustrates the variations in the ratio of resistance $R_h/R_o$ as the magnetic field H is varied. As shown in the graph, the magnetoresistance of the element 10 responds in different manners to magnetic fields of opposite directions and its sensitivity is high.

Figure 4:
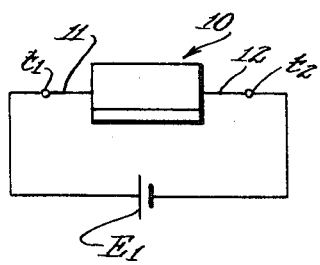
FIG. 4 is a schematic diagram of the magnetoresistance element shown in FIG. 1.

FIG. 4 is a connection diagram of the magnetoresistance element 10 and shows the terminals $t1$ and $t2$ and leads 11 and 12.

Figure 5:
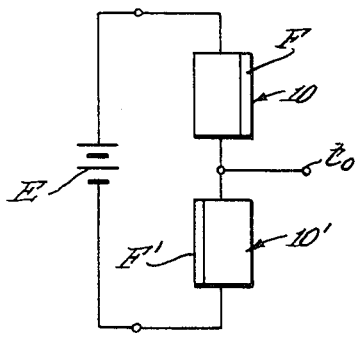
FIG. 5 is a connection diagram illustrating one example of a magnetoresistance pair.

FIG. 5 illustrates a pair of magnetoresistance elements 10 and 10′ connected in series with the battery E and with an output terminal $t_o$ connected to the connection points between the magnetoresistance elements 10 and 10′. It is to be noted that the magnetoresistance elements 10 and 10′ are connected so that the recombination regions F and F′, respectively, are on opposite sides so that a magnetic field passing out of the plane of the paper relative to the figure will deflect the current through one of the magnetoresistance elements toward the recombination zone and will deflect current passing through the other magnetoresistance element away from the recombination zone. This results in a differential effect which increases the sensitivity of the devices for detecting magnetic fields. For example, if a voltage of 6 volts is applied across the magnetoresistance elements 10 and 10′, the voltage appearing at terminal $t_o$ will vary from three volts plus or minus 2 volts when exposed to a magnetic field of two killogauss. Thus, the magnetoresistance element is very sensitive and weak magnetic fields may be detected.

Figure 6:
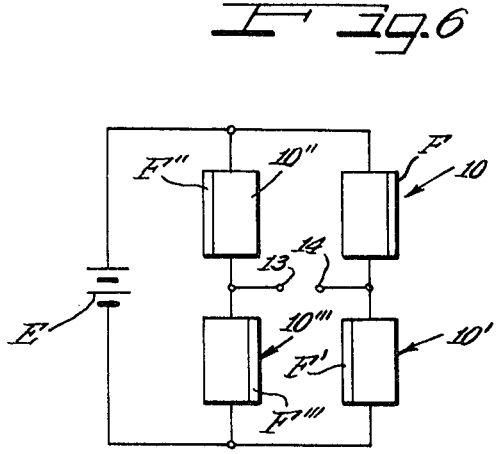
FIG. 6 is a connection diagram illustrating another example of two magnetoresistance pairs.

FIG. 6 illustrates a magnetoresistance bridge using four magnetoresistance elements 10, 10′ 10″ and 10‴ with elements 10 and 10′ connected in series across the battery E. The elements 10″ and 10‴ are also connected in series across the battery E. Contacts 13 and 14 are connected to the junction points, respectively, between magnetoresistance elements 10″ and 10‴ and 10 and 10′. The recombination zones F and F′ are formed on opposite sides of the magnetoresistance elements 10 and 10′ and the recombination zones F″ and F‴ are formed on opposite sides of the magnetoresistance elements 10″ and 10‴. The bridge thus formed as shown in FIG. 6 produces an output at terminals 13 and 14 which is very sensitive to magnetic fields.

FIG. 7 illustrates a magnetoresistance element comprising semiconductive material of P-type with semiconductive material of N-type attached to one end thereof and with a recombining region F extending along the edge of the P-type material. A battery E1 is connected to terminals 15 and 16 which are connected to opposite ends of the magnetoresistant element 17.

The magnetoresistance element 17 operates in a fashion similar to the magnetoresistance element illustrated in FIG. 1.

FIG. 8 illustrates a magnetoresistant element formed into a transistor-type element which comprises the intrinsic material I to which is attached at one end semiconductor material P and which has a pair of N-type elements N1 and N2 attached to the other end of the intrinsic material. Elements N1 and N2 are separated by a layer of intrinsic material designated as IA. A recombination region F is formed on one edge of the intrinsic material I by sanding or in another suitable manner. A first bias voltage source E1 is connected between the P-type material and the N-type material N2 and a second bias voltage E2 is connected between N1 and N2.

FIG. 9 illustrates the transistor-type magnetoresistance element shown in FIG. 8 connected in circuit.

FIG. 10 is a graph illustrating the current versus voltage characteristic between terminals 19 and 20 of the elements shown in FIGS. 8 and 9 as the magnetic field is varied.

FIG. 11 illustrates a transistor-type magnetoresistance element formed with a block of P-type material with a recombination region F formed on one side and with a pair of N-type semiconductor elements attached to one end of the P-type material and designated, respectively, as N1 and N2. Leads 24 and 26 are connected to N1 and N2, respectively, and lead 23 is connected to the other end of the P-type material and a bias voltage E2 is connected between the semiconductor materials N1 and N2.

FIG. 12 is a connection diagram of a pair of transistor-type magnetoresistance elements such as shown in FIGS. 8 or 11 connected in circuit. Resistor $R_1$ is connected between the transistor-like magnetoresistance element 27 and the transistor magnetoresistance element 28. A resistor $R_2$ is connected as shown between the elements 27 and 28. The biasing battery E is connected between the magnetoresistance transistor-like elements 27 and 28.

FIGS. 13 through 26 illustrate a method of making magnetoresistance pairs which are balanced and which have similar characteristics so that they may be used in the circuits such as shown in FIGS. 5 and 6, for example.

Many studies have shown that the temperature coefficients of the magnetoresistance elements depend primarily upon the value of the retained impurity in the intrinsic region or the absolute value of $n-p$ ($n$ being the number of electrons per cubic centimeter and $p$ being the number of holes per cubic centimeter).

It is normally necessary that the absolute value of $n-p$ be under $10^{12}$ per cubic centimeter for improving the sensitivity. It is, however, difficult to obtain a uniform impurity distribution of the substrate with present crystal manufacturing techniques. For example, semiconductor wafers of substrates vary by ten percent. Also, the value of $n-p$ may change because of temperature differences during the heat-treating process. Thus, magnetoresistance pairs must be given the same heat treatment to obtain a wafer with uniform values of $n-p$.

FIGS. 13 to 26 illustrate a process for making magnetoresistor elements in pairs which are uniform. FIG. 13, for example, shows a semiconductor wafer of germanium I. FIG. 14 is a sectional view of the germanium wafer. FIG. 15 illustrates a pellet 2 which is cut from the wafer I and might, for example, have the dimensions of 0.1 by 0.2×1.0 millimeter in size. FIG. 16 is a sectional view through the pellet 2 of FIG. 15.

FIG. 17 illustrates N and P-type regions 3a, 3a', 3b and 3b' formed in the pellet 2 by alloying or diffusing into the pellet to form PI and NI juctions. The pellet 2 is formed of intrinsic semiconductor material. The alloying may be done at 500 to 600° C. for ten seconds to ten minutes. FIGS. 19 and 20 illustrate leads 5 connected to the P and N regions 3a, 3a' 3b and 3b', respectively.

The pellet 2 may be soaked in a solution of hydrogen peroxide to make the surfaces stable.

FIGS. 21 and 22 illustrate the method of attaching the pellet 2 to a base plate 7 of ferrite material with resin 6, for example, epoxy resin. The plate 7 may also be ceramic or other insulating material. The resin 6 makes a firm connection between the pellet 2 and the ferrite plate 7.

FIGS. 23 and 24 illustrate the pellet after it has been cut into two parts by a diamond cutting wheel or by abrading such as by sandblasting or by etching to make a pair of magnetoresistance elements. As shown in FIG. 24, the groove 4 is formed through the pellet 2 so that the two portions thus formed of the pellet are separated from each other. Cutting forms two combination regions F on the surfaces formed at the wall in the groove of the magnetoresistance elements. FIGS. 25 and 26 illustrate a coating of resin 6 which has been placed in the groove 4.

FIG. 27 illustrates a pair of magnetoresistance elements 2a and 2b connected in circuit with a battery E. A lead connects region 3a with the region 3b' and a lead connects region 3a' to the positive terminal of the battery E. The negative terminal of the battery E is connected to the region 3b and output terminals are connected between the regions 3b and 3b'.

It has been discovered that it is convenient during the manufacture that the semiconductor surfaces are protected by resin during the cutting operation.

FIGS. 28–39 illustrate another method of making pairs of magnetoresistance elements. FIG. 28 illustrates a disc of intrinsic semiconductor material on which a plurality of N and P regions are formed by alloying in or diffusing P and N-type doner impurities to form PI and NI junctions. FIG. 29 is a side view of the substrate I of FIG. 28. FIGS. 30 and 31 illustrate a pellet 2 which is formed by cutting the substrate I into elements with four P and N-type regions designated as 3a, 3a', 3b and 3b', respectively. FIGS. 32 and 33 illustrate leads 5 which are connected to the p and n-type junctions.

In FIGS. 34 and 35 the pellet is attached to a ferrite or permalloy plate with resin 6.

As shown in FIGS. 36 and 37, a groove 4 is cut with a diamond wheel or by sandblasting or etching through the pellet 2 to form the magnetoresistance elements 2a and 2b, respectively. The cutting and sandblasting simultaneously form recombination regions on the elements 2a and 2b. FIGS. 38 and 39 illustrate resin 6 applied to the groove 4 to fill it.

FIGS. 40–48 illustrate another method of making magnetoresistance pairs. FIG. 48 illustrates a germanium substrate of intrinsic material I upon which resistance material 2 has been deposited as, for example, by photoresist techniques. The resistance material might be KPR, for example. Areas 4 dividing the substrate into pellet-size areas are formed through the resistance layer 2 by photo etching or other suitable means. Holes 3a, 3b, 3c and 3d are formed adjacent the corners of each of the pellets.

FIG. 40 shows the sheet illustrated in FIG. 48 in section. If desired, the resistive layer KPR may be attached to the germanium substrate I on the lower side as shown in dotted line in FIG. 40 and designated as 2a.

After the separation areas 4 and holes 3a–3d are formed through the resistive layer, the substrate is placed in an etching bath to form the grooves 13a, 13b, 13c and 13d, as shown in FIG. 41. Simultaneously, the separation areas 4 are etched deeper into the substrate I.

As shown in FIG. 42, after the grooves 4 and holes 13a–13d are formed, the resistance layer 2 is removed with a suitable solvent.

In FIG. 43, alloying materials 9 have been placed in the holes 3a–3d. In holes 3a and 3c alloying material indium-gallium may be placed, and in holes 13b and 13d indium-arsenide may be placed.

The substrate with the alloying material is then placed in a suitable furnace and heat-treated between the temperatures of 500–600° C. for a time that may vary from ten seconds to ten minutes to make an alloyed junction. The substrate is then etched to form a very smooth surface on the alloying material 9 and to cut the separation areas through to divide the pellets into separate units, as shown in FIG. 44.

The pellets thus formed with the alloy material 9 in the holes 3a–3d has leads 5 connected to each of the alloyed materials 9 as shown in FIG. 45. In this figure the pellet has been inverted and leads 5 have been attached. The element is then attached to a header 6, as shown in FIG. 46. Epoxy 7 is used to attach the pellet substrate I to the header 6.

A longitudinal groove 8 is cut through the pellet, as shown in FIG. 47, with a diamond wheel or an abrasion (sandblast) thus forming recombination regions on the edges of the groove 8. Due to the symmetry and method in which the magnetoresistance pairs have been formed, elements with the same characteristics are obtained and it is seen that the process shown in FIGS. 40–48 discloses a simple method of constructing matched magnetoresistance pairs.

FIG. 49 illustrates a modification wherein the substrate I is formed with grooves 13e and 13f in which alloying materials 9 are placed with the material 13e being a p-type alloy and the material in groove 13f being an n-type alloy. The pellet is processed as in the method of FIGS. 40–48 by connecting suitable leads and attaching to a header by epoxy after heat-treating, and a longitudinal groove is then cut with a diamond wheel or by sandblasting so as to cut each of the alloyed portions shown in FIG. 49 into separate elements. This forms a recombination zone through the pellet and forms a matched magnetoresistance pair.

FIGS. 50 and 51 illustrate the method of constructing a transistor-type magnetoresistance element. The pellet is formed with four openings 13a, 13b, 13c, and 13d on its top surface which are filled with suitable alloying material of p and n-type, as in the structure of FIG. 48, and a pair of opening 13a' and 13c' are formed in the opposite surface of the substrate pellet and are filled with an alloying substance of the same type which fills the openings 13b and 13c. This may be of the p or n-type. The holes 13b and 13d are filled with an alloying material which is different from the alloying material in openings 13a, 13c, 13a' and 13c'. The elements may be cut along the dotted line of FIG. 50 to form two transistor-type magnetoresistance elements as shown in FIG. 13. It is to be realized, of course, that suitable leads will be attached to the element and the units will be attached to a suitable header by epoxy in the same fashion as illustrated in FIGS. 46 and 47.

With a voltage E of six volts, the temperature was varied from −10° C. to +60° C. and the output voltage was 3 volts plus or minus 0.05 volt. In a pair of magnetoresistance elements made by the other method, variation of the output voltage was 3 volts plus or minus 0.3 volt with the same condition. According to the experiment, it is well understood that the pair of magnetoresistance elements of this invention has a better temperature characteristic than that made by the other method.

The principles of the invention explained in connection with the specific exemplifications thereon will suggest many other applications and modifications of the same. It is accordingly desired that in construing the breadth of the appended claims they shall not be limited to the specific details shown and described in connection with the exemplifications thereof.

I claim as my invention:

1. The method of forming a matched pair of magnetoresistance elements comprising, forming pellets from substrate material of intrinsic semiconductor material, forming four areas on each pellet on one side thereof for receiving p- and n-type materials each of said areas having the same geometrical relationship to the other three areas, applying p-type material to a first side by side pair of said four areas of said pellets, applying n-type material to the other side by side pair of said four areas, then heat treating said pellets to alloy said p- and n-type materials to said substrate material, and cutting a groove in each of said pellets so as to form a pair of recombination regions, and to separate said pellet to form a matched pair of magnetoresistance elements each containing one of the p-type and one of the n-type areas.

2. The method of claim 1 wherein leads are attached to each of said areas of each pellet.

3. The method of claim 1 wherein said areas on each pellet is formed by etching openings into said pellets.

4. The method of claim 1 wherein each of said areas on each pellet and each pellet is formed by applying photoresistance material to said substrate material and selectively removing said photoresistance material to form separation zones between each pellet and to form said four areas on each pellet, etching said substrate material to form openings at said four areas and to cut said substrate material into pellets on said separation zones.

5. The method of claim 4 comprising attaching leads to each of said four areas of each pellet, and attaching each of said pellets to a backing plate.

6. The method of claim 5 comprising encapsulating said pellets including the four areas and the recombination regions.

7. The method of claim 1 wherein said heat treating comprises heating said pellets in the range of five seconds to twenty minutes.

8. The method of claim 1 wherein said heat treating comprises heating said pellets in the range of ten seconds to ten minutes.

9. The method of claim 1 wherein said heat treating is done in the range between 250 to 900 degrees centigrade.

10. The method of claim 1 wherein said heat treating is done in the range between 500 to 600 degrees centigrade.

11. The method of claim 1 wherein said substrate material is substantially intrinsic.

12. The method of claim 11 wherein a PI-type junction and an NI-type junction is formed on each side of the groove formed in each of said pellets.

13. The method of claim 12 wherein said groove is symmetrically cut so as to form a pair of magnetoresistance elements with substantially the same characteristics.

14. The method of claim 1 wherein the groove is cut into each pellet with an abrasive to separate the magnetoresistance pairs and to form a pair of recombination regions.

15. The method of claim 14 wherein said abrasive is a diamond cutting wheel.

16. The method of claim 14 wherein said abrasive comprises sand blasting.

17. The method of claim 1 wherein said four areas are formed on each pellet by attaching p- and n-type material transversely across said pellets and said groove cuts symmetrically through said p- and n-type material to form a matched pair of magnetoresistance elements.

18. The method of claim 1 including two more areas formed on the other side of each of said pellets and aligned with either said first pair or second pair of said four areas, and applying p- or n-type material to said two more areas so that said two more areas are of the same type as the areas with which they are aligned.

References Cited

UNITED STATES PATENTS

| | | | |
|---|---|---|---|
| 2,944,321 | 7/1960 | Westberg | 148—171X |
| 3,046,176 | 7/1962 | Basenberg. | |
| 3,288,662 | 11/1966 | Weisberg | 29—583X |
| 3,224,297 | 6/1967 | Stieltjes et al. | 317—235X |
| 3,385,981 | 5/1968 | Mayer et al. | 317—235X |
| 3,392,440 | 7/1968 | Yanagawa | 29—580X |
| 3,432,919 | 3/1969 | Rosvold | 317—235X |

JOHN F. CAMPBELL, Primary Examiner

C. E. HALL, Assistant Examiner

U.S. Cl. X.R.

29—25.3, 589; 148—171, 179, 188, 190; 317—235